United States Patent
Weidemann et al.

(10) Patent No.: US 11,247,559 B2
(45) Date of Patent: Feb. 15, 2022

(54) METHOD FOR OPERATING A MOTOR VEHICLE, IN PARTICULAR A TRUCK, AND MOTOR VEHICLE

(71) Applicant: AUDI AG, Ingolstadt (DE)

(72) Inventors: Dieter Weidemann, Stammham (DE); Hans Joerg Bruehl, Koesching (DE); Heiko Hanickel, Kipfenberg (DE); Christoph Franke, Denkendorf (DE); Francisco Javier Caicedo Montalvo, Ingolstadt (DE); Matthias Mayer, Hepberg (DE)

(73) Assignee: AUDI AG, Ingolstadt (DE)

( * ) Notice: Subject to any disclaimer, the term of this patent is extended or adjusted under 35 U.S.C. 154(b) by 91 days.

(21) Appl. No.: 16/630,999

(22) PCT Filed: Aug. 27, 2018

(86) PCT No.: PCT/EP2018/073047
§ 371 (c)(1),
(2) Date: Jan. 14, 2020

(87) PCT Pub. No.: WO2019/048283
PCT Pub. Date: Mar. 14, 2019

(65) Prior Publication Data
US 2020/0223310 A1    Jul. 16, 2020

(30) Foreign Application Priority Data

Sep. 6, 2017   (DE) .................. 10 2017 215 700.3

(51) Int. Cl.
*B60K 23/08*   (2006.01)
*B60K 17/35*   (2006.01)
*B60K 23/04*   (2006.01)

(52) U.S. Cl.
CPC .............. *B60K 17/35* (2013.01); *B60K 23/04* (2013.01); *B60K 23/0808* (2013.01); *B60K 2023/085* (2013.01); *B60K 2023/0816* (2013.01)

(58) Field of Classification Search
CPC .... B60K 17/35; B60K 23/04; B60K 23/0808; B60K 2023/0816; B60K 2023/085;
(Continued)

(56) References Cited

U.S. PATENT DOCUMENTS 5,735,584 A * 4/1998 Eckert ................... B60T 8/1755
                                                                 303/140
2011/0257858 A1   10/2011 Kobayashi et al.
2015/0096814 A1    4/2015 Maeda

FOREIGN PATENT DOCUMENTS

DE         10333654 A1    2/2005
DE     102012222197 A1    6/2014
(Continued)

OTHER PUBLICATIONS

English-language translation of International Preliminary Report on Patentability dated Mar. 19, 2020, in corresponding International Application No. PCT/EP2018/073047; 7 pages.
(Continued)

*Primary Examiner* — Justin Holmes
(74) *Attorney, Agent, or Firm* — Maier & Maier, PLLC (57) ABSTRACT

A method for operating a motor vehicle having a four-wheel drive and a drive unit, which can be switched on and off during travel, wherein the motor vehicle is driven by a torque provided by the drive unit, and the initially disengaged four-wheel drive is switched on, including: determining at least one limit torque which, while the four-wheel drive is switched off, can be transmitted from at least one wheel of the motor vehicle driven by the drive unit to the ground surface upon which the motor vehicle is travelling,
(Continued)

while the slip between the at least one wheel and the ground surface falls below a specifiable threshold value.

20 Claims, 2 Drawing Sheets

(58) Field of Classification Search
CPC .............. B60K 23/08; B60W 2520/26; B60W 2520/30; B60W 2710/0666; B60W 2710/0672; B60W 2552/40
See application file for complete search history.

(56) References Cited

FOREIGN PATENT DOCUMENTS

| DE | 102014016374 B3 | 3/2016 | |
|---|---|---|---|
| DE | 102014016376 A1 | 5/2016 | |
| EP | 1057676 A2 * | 12/2000 | ......... B60K 23/0808 |
| GB | 2488241 A * | 8/2012 | ............. B60K 17/34 |

OTHER PUBLICATIONS

German Office Action dated Feb. 23, 2021, in connection with corresponding DE Application No. 10 2017 215 700.3 (12 pp., including machine-generated English translation).
German Examination Report dated Jul. 11, 2019 in corresponding German Application No. 102017215700.3; 18 pages; Machine translation attached.
International Search Report dated Nov. 16, 2018 and Written Opinion in corresponding International Application No. PCT/EP2018/073047; 12 pages; Machine translation attached.

* cited by examiner

METHOD FOR OPERATING A MOTOR VEHICLE, IN PARTICULAR A TRUCK, AND MOTOR VEHICLE

FIELD

The disclosure relates to a method of operating a motor vehicle, in particular a truck. The disclosure, furthermore, relates to motor vehicle.

BACKGROUND

Such a method for operating a motor vehicle, in particular a truck, equipped with four-wheel drive, which can be switched on and off, and having a drive unit, is already known from DE 10 2014 016 376 A1. In this method, the motor vehicle is operated while in motion, during which the motor vehicle is driven by means of a torque provided by the drive unit, and thus by means of the drive unit. Furthermore, the initially disengaged four-wheel drive, is switched on using the method.

Moreover, DE 103 33 654 A1 discloses a control unit for an at least temporarily four-wheel-driven truck comprising a control unit. In addition, DE 10 2012 222 197 A1 provides a method for distributing the torque of a drive torque on a primary axle and a secondary axle of a motor vehicle.

SUMMARY

The object of the present invention is to create a method and a motor vehicle, such that particularly advantageous, specifically, particularly efficient operation of the motor vehicle may be realized.

A first aspect of the invention relates to a method of operating a motor vehicle, in particular a truck, and preferably a passenger truck, while in motion. The motor vehicle has a four-wheel drive, which can be switched on and off, and a drive unit, by means of which the motor vehicle can be driven or is driven. In the method, the motor vehicle is driven during travel by means of at least one torque provided by the drive unit. The four-wheel drive and the drive unit are integrated in, e.g., a drivetrain of the motor vehicle. Furthermore, the motor vehicle, in particular the drivetrain, has, e.g., at least or exactly four wheels, also referred to as motor wheels and which, in principle, can be driven by the drive unit. The four-wheel drive, which is initially disengaged, is engaged by the method.

If the four-wheel drive is engaged or activated, the at least or exactly four wheels are driven by means of the drive unit, while the motor vehicle is travelling with the four-wheel drive engaged, in particular when a clutch or a respective frictional connection between the wheel and the respective drive unit is closed and the drive unit is providing said torque. The torque provided by the drive unit in order to drive the motor vehicle or the wheels is also referred to, e.g., as the drive torque or drive torque and is distributed, e.g., between the wheels driven by the drive unit. Thus, when the four-wheel drive is engaged or activated, the torque is distributed between the aforesaid four wheels.

If the four-wheel drive is disengaged, i.e., deactivated, then, e.g., a two-wheel drive of the motor vehicle is activated, whereby the motor vehicle is in two-wheel drive mode. In two-wheel drive mode, precisely two wheels are driven by the four wheels, which are basically drivable by means of the drive unit, in particular, when a clutch or a frictional connection between the respective wheel and the drive unit is closed, and the drive unit provides the torque.

Thus, e.g., in two-wheel drive mode, the drive torque is distributed between the wheels, which are driven by the drive unit in two-wheel drive mode. As four-wheel drive can be switched on and off, it is possible to switch between four-wheel drive and two-wheel drive as needed.

In order to achieve a particularly advantageous, especially, a particularly dynamic and at the same time particularly safe operation of the motor vehicle during travel, the invention provides, in particular by means of an electronic computing device of the motor vehicle, that at least one limit torque is determined, which, while the four-wheel drive is switched off can be transmitted by at least one of the wheels of the motor vehicle, driven by means of the drive device, in particular at most to the ground surface upon, which the motor vehicle is travelling, while the slip between the at least one wheel and the ground surface falls below a specifiable threshold value.

Limit torque, or limit drive torque, another term for limit torque, refers to a torque having a limit value, which, if exceeded by the drive torque, could give rise to excessive slip. Limit torque therefore, e.g., refers to a torque, which can be provided by a drive unit and having the aforementioned limit value. The limit value or the limit torque is also termed in German, e.g., two-wheel force limit, two-wheel limit, or two-wheel force limit.

The method according to the invention also provides for the engagement time to be determined or calculated, in particular by the electronic computing device, which is required to set a time characteristic of the torque provided by the drive unit, i.e., to shape the torque, also referred to as driving torque or drive torque, in a targeted manner, such that the drive torque exceeds, in particular exactly, the limit torque, when the four-wheel drive is engaged.

Furthermore, the method according to the invention provides, in particular while the four-wheel drive is still disengaged, that a time characteristic of the torque, in particular a build-up or an increase in the torque provided by the drive unit in order to drive the motor vehicle, in particular in two-wheel drive mode, be set depending on the determined engagement time, in particular by means of the electronic computing device. Thus, the torque time characteristic is set as a function of the limit torque.

In order to, e.g., switch on the initially disengaged four-wheel drive, at least one or more actuators are controlled by the electronic computing device, e.g., in order to move at least one or more switch elements by means of the at least one or more actuators. In other words, the electronic computing device controls the at least one or more actuators, e.g., in order to switch at least one or more switch elements from a first to a second state. In the first state of the respective switch element, e.g., the four-wheel drive is disengaged. In the second state of the respective switch element, e.g., the four-wheel drive is engaged. In other words, e.g., the respective first state is intended to switch off the four-wheel drive, whereas the respective second state is intended to switch on or activate the four-wheel drive. The engagement time represents the time span or duration required to switch the respective switch element from its first to its second state. In particular, the engagement time extends, e.g., from the start of the aforementioned actuation up to an instant, in which the respective or the last switch element, in particular emerging from its first state, reaches its second state.

By means of the method according to the invention, e.g., particularly dynamic operation or particularly dynamic travel of the motor vehicle can be achieved, since, in particular during two-wheel drive mode, the torque is set particularly high or as high as possible, in order to, e.g., be able to almost achieve at least the drive dynamics required by the driver of the motor vehicle and thus at least almost meet a corresponding requirement of the driver. Also, the torque (drive torque) can be kept as low as needed, e.g., in order to avoid undesirable driving conditions, such as excessive loss of traction, especially during two-wheel drive mode, and thus before engaging the four-wheel drive.

In a particularly advantageous embodiment of the invention, at least one torque setpoint requested by the driver of the motor vehicle is determined, in particular by means of the electronic computing device. The request for the setpoint, also referred to in the following as the second setpoint, represents, e.g., the above handling or drive dynamics requested by the driver. The setpoint requested by the driver is also referred to as the driver request or driver preference. For example, the driver initially requests a first torque setpoint, particularly when the four-wheel drive is disengaged, whereby the first setpoint can be and is provided by the drive unit and the four-wheel drive. In other words, the first torque setpoint is then set, in particular by means of the electronic computing device. As part of the driver request, the driver increases the request, e.g., from a first setpoint to a second setpoint, which is greater than the first setpoint. Again, to put it differently, the driver prefers the drive system to provide the second setpoint, which is higher than the first setpoint, instead of the first setpoint. This allows the driver to adjust the setpoint. The driver can adjust the relevant setpoint, in particular by operating or actuating at least one control element, whereby the driver operates or actuates the control element. The control element may be, e.g., a pedal, also referred to as an accelerator pedal, foot-operated by the driver, and which can be moved into different positions by pressing the pedal. The positions of the pedal correspond to the respective setpoints of the torque, which is to be or is provided by the drive system.

Furthermore, it is preferably provided that the torque is at least temporarily limited, in particular by means of the electronic computing device, to at least one actual torque value, which is lower than the second setpoint requested by the driver, depending on the determined engagement time. This embodiment is based, in particular, on the following knowledge:

In typical, in particular conventional drivetrains, the engagement time is usually less than the build-up time required by the drive unit or the drivetrain in order to, e.g., increase the torque from the first setpoint to the second setpoint. In this case, e.g., the torque may be increased or adjusted to match the second setpoint without special intervention, in particular by means of a ramp, in particular also if the second setpoint torque leads or would lead to an excessive loss of traction or excessive slip during two-wheel drive mode, in particular between the driven wheels and the ground surface along or upon which, the motor vehicle is travelling. This increase in torque does not cause undesirable driving conditions, since upon completion of the torque increase, whereby the torque reaches the second setpoint, the four-wheel drive is already engaged. In four-wheel drive, the second setpoint torque does not give lead to excessive slip or loss of traction. This means that with a conventional drivetrain, the engagement of the four-wheel drive is more dynamic or can occur more dynamically than can the torque increase.

However, modern, especially electrified or electric drivetrains can have a high torque build-up dynamic, such that the increase in torque provided by the drive system is or may be more dynamic than the engagement of the initially disengaged four-wheel drive. Limiting the torque, especially during two-wheel drive, can prevent the torque during two-wheel drive mode from reaching the second setpoint or a very high value that would lead to excessive slip during two-wheel drive mode. As described above, the actual value should preferably be selected or set as high as possible in order for the motor vehicle to achieve a particularly dynamic performance, however, the actual value should be set as low as needed to avoid excessive slip. The increase in torque, also referred to as torque build-up, is thus manipulated and, in particular, actively retarded, such that the torque reaches the second setpoint requested by the driver, or a very high value that would lead to excessive slip during two-wheel drive mode, although not when four-wheel drive is engaged, only when the four-wheel drive is engaged, i.e., when two-wheel drive mode is deactivated.

Moreover, it is also possible, e.g., to leave the very efficient two-wheel drive mode activated for as long as possible to allow for particularly efficient operation to be achieved. The high efficiency of two-wheel drive mode or two-wheel drive results in particular in that, when four-wheel drive is switched off, components that are not required to activate two-wheel drive are shut down or switched off, i.e., disconnected, e.g., from the rest of the drivetrain. However, if the four-wheel drive is switched on after the motor vehicle has been immobilized, this immobilization requires the aforementioned engagement time for the initially deactivated four-wheel drive to be reactivated. However, during two-wheel drive mode, only a traction and driving dynamics potential that is lower than for four-wheel drive can be used, in that only two wheels are drivable or are driven in two-wheel drive mode, whereas four wheels are driven in four-wheel drive. Against this background surface, the method according to the invention makes possible targeted and as-needed shaping of the drive torque, especially the build-up of the drive torque, such that a particularly advantageous drive performance can be represented. In particular, in case of highly dynamic drivetrains or drive systems, such as in hybridized systems, electric turbochargers and/or highly dynamic naturally aspirated engines, a particularly dynamic and, at the same time, particularly safe drive performance can be ensured, while also allowing for particularly efficient operation, in that excessive or undesired early engagement of the four-wheel drive and thus changing from two-wheel drive mode to four-wheel drive can be avoided. In other words, it is possible to configure the dynamics of the drivetrain at least almost at will, such that even in situations of fundamentally unfavorable engagement times, in which the engagement time exceeds the build-up time, it is possible to drive in two-wheel drive mode, also known as efficiency mode.

Here, it has proven particularly advantageous, if the torque is limited to the actual value at least before completion of the engagement time in order to ensure particularly safe handling.

In order to realize a particularly advantageous motor-vehicle dynamic, e.g., to be able to fully meet the aforementioned driver request, a further embodiment of the invention provides, e.g., that after at least completion of the engagement time, an increase of the torque from the actual value to the setpoint or a second setpoint is enabled, whereby the torque is increased from the actual value to the setpoint.

In order to realize a particularly safe drive performance, a further embodiment of the invention provides that after completion of the engagement time and after completion of an additional, specifiable latency time, the increase is enabled and the torque increased from the actual value to the desired value. This ensures that the torque is increased then and only then to the setpoint, when the four-wheel drive is safely engaged.

In a further embodiment of the invention, the torque is limited to the actual value depending on a torque reserve to be maintained.

In a further embodiment of the invention, the engagement time is determined as a function of at least one closure time required for closing at least one clutch to be closed in order to engage the four-wheel drive. The clutch is closed, e.g., in order to engage the four-wheel drive. Thus, the clutch is, e.g., one of the aforementioned switch elements, whereby the clutch is closed in order to engage the four-wheel drive and thus switched from its first to its second state. The closure time can be determined empirically, for example by means of tests, and is stored, e.g., in a memory of the electronic computing device.

It has proven to be particularly advantageous, if the engagement time is determined as a function of at least one acceleration time, which is required in order to accelerate a first shaft of the motor vehicle, in particular of the drivetrain, which is designed, e.g., as a drive shaft, when the four-wheel drive is engaged from a first rotational speed to a second rotational speed, which is greater than the first rotational speed, whereby in at least one clutch, in particular the aforementioned clutch via which the first shaft is coupled to at least a second shaft upon engaging the four-wheel drive, a difference in rotational speed is zero or is cancelled. This will ensure a particularly comfortable drive performance.

A second aspect of the invention relates to a motor vehicle designed, e.g., as a motor vehicle, in particular a passenger car designed to carry out a method according to the invention. Advantages and advantageous designs of the method according to the invention are to be regarded as advantages and advantageous designs of the motor vehicle according to the invention, and vice versa.

The method according to the invention can have the following components or steps:

Calculation of basic physical parameters
Calculation of the engagement time
Calculation of a driver-specific transverse dynamic to be taken into account
Calculation of the transmissible limit torque in two-wheel drive mode
Calculation of the torque reserve as a driver-specific acceleration reserve
Shaping or setting the torque
Adjustment of the torque characteristic
Smoothing of the torque signal by time tolerance
intelligent preventive all-wheel drive logic to avoid insufficient drive dynamics For example, the following four partial times are calculated, when calculating the engagement time:

Time until a drag-torque balance of components, in particular a drive shaft, of the drivetrain becomes positive
Time until the drive shaft has accelerated to a second speed, also referred to as the target speed
Time until the clutch, e.g., designed as a separating clutch, and arranged especially at a rear axle of the drivetrain, is closed
Time until a desired all-wheel torque is built up The basis for an exact time estimate is, e.g., measured over the duration, until the drive shaft or the first shaft has reached their target speed. The duration is calculated from the knowledge of the drive shaft speed gradient and the rotational speed differential between a current actual rotational speed and the target rotational speed. The rotational speed difference can, e.g., be calculated from at least one value provided by a sensor, whereby the sensor is used to record, e.g., the rotational speed of the first shaft or drive shaft. The target speed can be calculated, for example, from the vehicle speed, tire circumference and differential gear ratio. The speed gradient, for example, is specified directly, as [it is] the decisive parameter for engagement comfort. Thus, all parameters are known for calculating the build-up time, i.e., the time required for the drive shaft to reach its target rotational speed. By using the sensor, which is designed, e.g., as a speed sensor, on the drive shaft, the speed gradient can be determined by deriving the speed, and then subsequently included in the time calculation. Thus, the time duration can react to control disturbances and be corrected.

The duration until the drag-torque balance becomes positive can be determined, e.g., by tests and stored in the electronic computing unit, which is designed, in particular, as a control unit. Since the time until the drag-torque balance becomes positive may change due to component ageing, it is advisable to take component ageing into account.

The closure time is derived, e.g., from the magnet-drop time and the travel time of a clutch claw. The closure time can be determined by tests, however, it is minute overall, especially compared with the time required to accelerate the first shaft or the drive shaft up to the second speed (target speed). The above time until the desired all-wheel torque is built up can be calculated, especially when using an electromechanical all-wheel clutch to build up the all-wheel torque, by a ratio of the required all-wheel clutch adjustment travel over the possible adjustment speed. For example, an electric motor, in particular a BLDC motor, is used for the all-wheel clutch, allowing the all-wheel clutch to be closed. The all-wheel clutch is, e.g., a further clutch in addition to the aforementioned clutch. All-wheel torque refers, e.g., to a torque exceeding the above described limit torque and can therefore only be transmitted, e.g., by engaging the four-wheel drive without causing excessive slip.

The abovementioned limit torque depends, for example, on the longitudinal and transverse force acting on the respective wheel. In order to preferably avoid constant operation and unnecessarily frequent switching maneuvers, in which switching between four-wheel drive mode and four-wheel drive mode takes place, the transverse dynamics of the motor vehicle or the driver of the motor vehicle, for example, can be trained or calculated. A filter, for example, is used, which determines the transverse dynamics via the speed and filters this value. The value is held for a certain duration and then re-reduced via a gradient. However, the value is reduced to a specified transverse dynamic via speed, which represents the basis for smoothing signal noise, road bumps and minor curves in the road.

The deductible limit torque is calculated using the following factors:

Vertical wheel force
Coefficient of friction
Shear force

The term "transmissible" should be understood to mean that just enough limit torque can be transmitted from a particular wheel to the ground surface so as not to cause excessive slip or loss of traction for that wheel, while the four-wheel drive is disengaged and the particular wheel is driven by means of the drive unit. If the transmission performance of the wheel tire is known, a total transmissible force can be calculated from the vertical wheel force and the coefficient of friction. If the transverse force is subtracted from this force by way of vector subtraction, the transmissible longitudinal force is known. The transmittable wheel torque is thus known over the tire circumference, as is the limit torque.

In the following, the calculation of the torque reserve, i.e., the driver-specific acceleration reserve, is made: [If] In driving situations, in which the ratio of engagement time over torque dynamics or build-up time is very high, such that the engagement time and the build-up time differ greatly, instead of excessive limitation of the torque, which is dispensed with due to the efficiency advantage realized by means of two-wheel drive mode, such that, e.g., switching from two-wheel drive mode to four-wheel drive occurs particularly early or in a predictive manner. For this purpose, e.g., the longitudinal dynamics of the driver or the vehicle are trained or determined analogously to the transverse dynamics. In addition, a required acceleration reserve is calculated using the driving resistance equation. The intention is to allow the driver a certain minimum acceleration, making it possible to accelerate even without a change of state in the four-wheel drive, which may be, e.g., all-wheel drive.

If the engagement times and the limit torque are known, then the drive torque can be shaped or adjusted, such that the limit torque is reached at the end of engagement of the four-wheel drive, including torque build-up in the all-wheel torque. Thus, the dynamics of the vehicle are limited only to the extent that a non-transmissible drive torque, i.e., the difference or differential between the limit torque and the setpoint desired by the driver, is not enabled.

The shaping of the drive torque can be done differently depending on the request:
for maximum wheel-torque power, the drive torque can be enabled up to the maximum possible limit value and maintained there, until additional torque, i.e., for example, the aforementioned differential between the limit torque in two-wheel drive mode and the setpoint desired by the driver, can be transmitted by connecting the four-wheel drive
for maximum comfort, the torque gradient can be kept constant in order to build up vehicle acceleration linearly
Alternatively, a typical turbocharger torque build-up performance can be modeled in order to display known torque build-up performance for the driver and make the intervention as unnoticeable as possible.

For example, the electronic computing equipment has a first control unit or a first module, which is used to adjust the torque. In addition, the electronic computing device has, e.g., a second control unit or a second module, with which the four-wheel drive is switched on and off, or the all-wheel torque is built up. Preferably, an interface between the modules is designed as a torque gradient in order to make signal propagation times irrelevant and limit the dynamics of the drivetrain, ahead of the transition from two-wheel drive mode to four-wheel drive.

If this is impossible for reasons related to the interface, e.g., because instead of a gradient interface, only one interface is provided as absolute torque, the torque itself should be set accordingly using a torque cover, in particular forced in. Here, the following steps can be provided:
Torque prediction (using the signal propagation time via a worst-case consideration of several control units, whereby the amount of torque is calculated, when engagement occurs, i.e., when the torque is set in a targeted fashion)
Adjusting the gradient to a target gradient (e.g., if the actual gradient is greater than the target gradient, then the gradient should be lowered gently)
Shaping
Phasing out the engagement.

With intelligent preventive all-wheel drive logic in order to avoid insufficient drive dynamics, e.g., the vehicle is driven in two-wheel drive mode by shaping the torque, until the limit torque, also known as the threshold, is actually exceeded. However, since this may result in a possibly perceptible difference between an acceleration process in two-wheel drive mode and an acceleration process with activated four-wheel drive, or unintentional curtailing of the vehicle dynamics, the torque-shaping signals are used, e.g., to already switch predictively from two-wheel drive to four-wheel drive in unintended limit situations, and thus operate the vehicle with activated four-wheel drive. For this purpose, e.g., the engagement time is calculated a second time, however, always from the perspective of two-wheel drive mode, in which, e.g., the drive shaft is stationary and the clutch is in an efficiency position, due to, e.g., the clutch being open.

Depending on the driving status, e.g., a trained driver, a drive-program switch, a transmission setting, etc., a minimum gradient can now be determined and stored, and should be safeguarded at all times. If the required engagement time is multiplied by the minimum gradient, the result is a difference in torque, which can build up to a maximum during engagement. If the drive torque exceeds the limit torque, then the four-wheel drive is already switched on predictively to ensure the required drive dynamics, while still achieving the desired drive performance. Here, the acceleration reserve and the trained transverse dynamics help prevent the four-wheel drive from needlessly being switched off, since, e.g., if the coefficient of friction is very low, then the actual speed cannot be maintained and disengagement would only be possible during temporary downhill travel.

Further advantages, features and details of the invention are found in the following description of a preferred exemplary embodiment, and in the drawing. The features and feature combinations mentioned above in the description, as well as the features and feature combinations mentioned in the below description of the figures, and/or shown separately in the figures, can in each case be used in the indicated combination, as well as in other combinations, or in isolation, without exceeding the scope of the invention.

DETAILED DESCRIPTION

Figure 1:
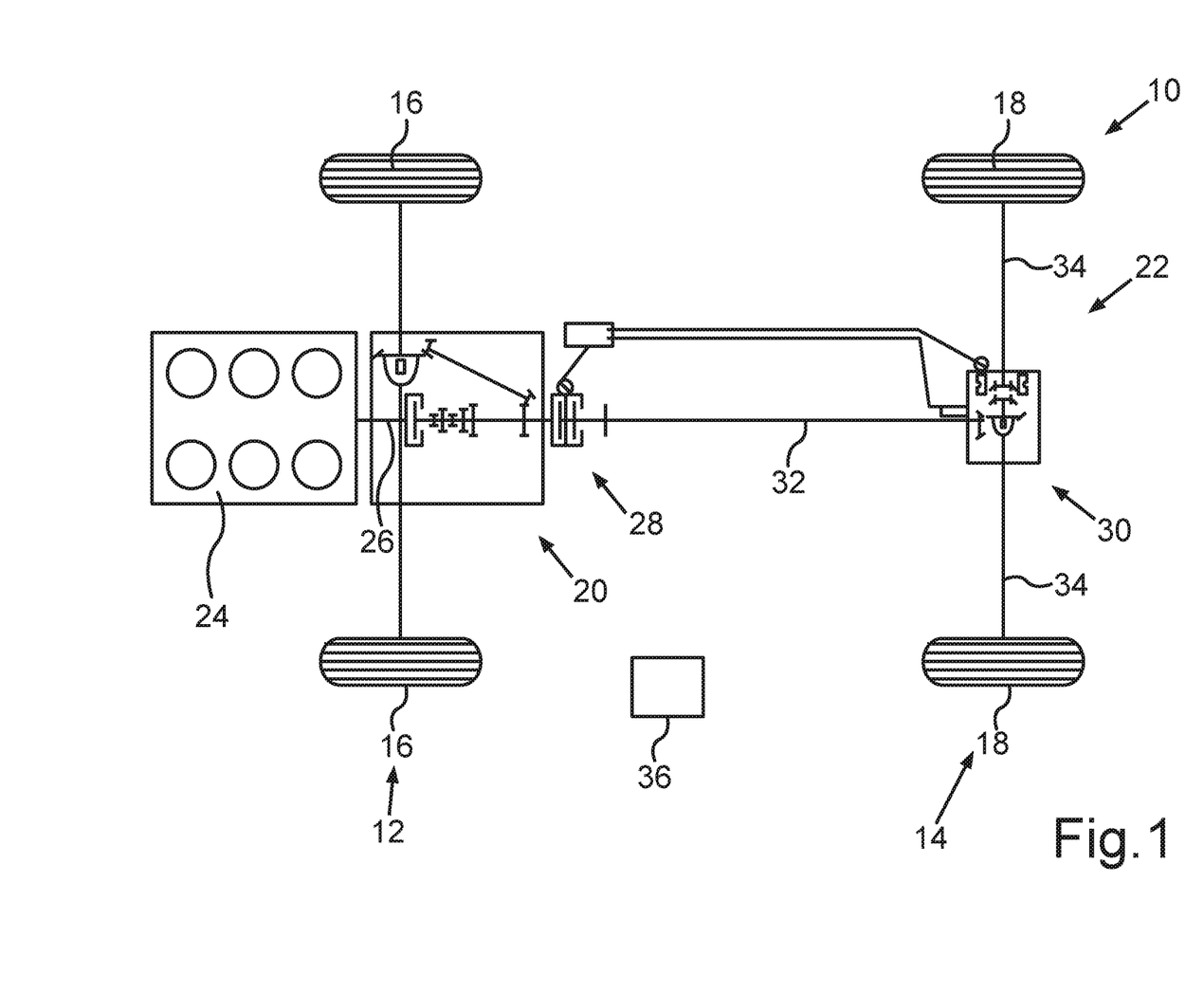
FIG. 1 illustrates a schematic representation of a motor-vehicle drivetrain, i.e., a method for operating the motor vehicle.

FIG. 1 shows a schematic diagram of a drivetrain 10 for a motor vehicle, particularly a truck, e.g., a passenger car. The motor vehicle can be driven by means of drivetrain 10. The drivetrain 10 comprises at least two axles 12 and 14 arranged in succession or behind one another in the longitudinal direction of the vehicle, wherein axle 12 is designed as a front axle and axle 14 as a rear axle in relation to the motor vehicle's forward direction of travel. The axle 12 or 14 also has its respective wheels 16 or 18, whereby the motor vehicle can be supported or is supported on the ground surface along which, it is, e.g., driven. If the motor vehicle is driven along the ground surface, the wheels 16 and 18 will roll off and away from said ground surface.

The drivetrain 10 further comprises a drive unit 20, with which, in principle, both wheels 16 and wheels 18 can be driven. The drivetrain 10 comprises a four-wheel drive 22, also referred to as an all-wheel drive system, which can be switched on and off. If the four-wheel drive 22 is switched off, i.e., deactivated, then two-wheel drive or two-wheel drive mode is activated. In two-wheel drive mode, a frictional connection between the drive unit 20 and the wheels 16 is closed, and a frictional connection between the drive unit 20 and the wheels 18 is interrupted or opened, such that during two-wheel drive mode, the wheels 16 are driven by the drive unit 20, while driving of the wheels 18 by means of drive unit 20 will not occur. Thus, for example, drive unit 20 provides at least one torque, also referred to as drive torque, in order to drive the motor vehicle. In two-wheel drive mode, the output torque is, e.g., transmitted or distributed between the wheels 16, but not the wheels 18.

When engaging or activating four-wheel drive, the drivetrain 10 is in four-wheel drive mode, whereby transmission of both wheels 16 and wheels 18 takes place by means of drive unit 20. Thus, in four-wheel drive mode, the torque provided by the drive unit 20 is transmitted or distributed between both wheels 16 and wheels 18.

For this purpose, the drive unit 20 comprises, e.g., a drive motor 24, which may be designed as an internal combustion engine. The drive motor 24 has, e.g., an output shaft 26, via which the drive motor 24 or the drive device 20 can provide the said torque (drive torque).

The four-wheel drive 22 and thus the drivetrain 10 have a first clutch in the form of a four-wheel clutch 28, which can be opened and closed. In addition, four-wheel drive 22 comprises a second clutch 30 arranged on the rear axle, which clutch may be designed, e.g., as a claw clutch or a separating clutch. Likewise, clutch 30 can, e.g., be opened and closed. If the particular clutch is open, it is, e.g., in a first state. If the particular clutch is closed, it is, e.g., in a second state.

Drivetrain 10 comprises a first shaft in the form of a drive shaft 32 and second shafts in the form of axle shafts 34. This allows the drive shaft 32 to be coupled to the output shaft 26 via the all-wheel clutch 28. Further, the drive shaft 32 can be coupled to the axle shafts 34 via the clutch 30. To disengage four-wheel drive 22, the clutches are opened, whereby the clutches are open in two-wheel drive mode. Drive shaft 32 is thus decoupled from both the output shaft 26 and the axle shafts 34, such that in two-wheel drive mode, during which the wheels 16 are driven by drive unit 20, neither drive unit 20, nor the wheels 18 rolling on the ground surface are driven. Drive shaft 32 is thus a component, which is immobilized, when the four-wheel drive 22 is immobilized. This makes particularly efficient operation possible.

However, when the four-wheel drive 22 is engaged, then the clutches are closed, such that the drive shaft 32 is driven by the output shaft 26 and hence by the drive unit 20 via the four-wheel clutch 28, and such that the axle shafts 34, and via these, the wheels 18 are driven by drive shaft 32 via the clutch 30 and by the drive unit 20 via these and via the four-wheel clutch 28. In order, for example, to activate the initially disengaged four-wheel drive 22, the clutches are switched from their respective first states to their respective second states. For example, to disengage the initially engaged four-wheel drive 22, the clutches are, e.g., opened and hence switched from their second state to their first state. Since the present drivetrain 10 has exactly four wheels 16 and 18, its four-wheel drive is designated as all-wheel drive, thus four-wheel drive mode is also designated as all-wheel drive mode.

In the following, a method for operating the drivetrain 10 and thus the vehicle, as a whole, is described with reference to the figures. The method involves that the motor vehicle, while operated and in motion, is driven by means of the aforementioned drive torque provided by the drive unit 20. Moreover, the four-wheel drive 22, which is initially disengaged, is switched on during the method.

In order to realize particularly dynamic, safe and efficient operation of the motor vehicle, the method involves determining at least one limit torque, in particular by means of a control unit 36, shown schematically in FIG. 1, of the motor vehicle, in particular drivetrain 10, which limit torque, while the four-wheel drive 22 is switched off, can be transmitted by at least one of the wheels 16 and 18 driven by means of the drive unit 20 to a ground surface upon which the motor vehicle is travelling, while a slip between the at least one wheel 16 or 18 and the ground surface falls below a specifiable threshold value. Furthermore, the engagement time Z is determined, in particular, calculated, by means of the electronic computing device 36, which is required in order to set a time characteristic of the torque provided by the drive unit 20, such that the torque exceeds the limit torque, when four-wheel drive 22 is switched on. Furthermore, the time characteristic of the torque is set, in particular by means of the electronic computing device 36, as a function of the determined engagement time Z.

Figure 3:
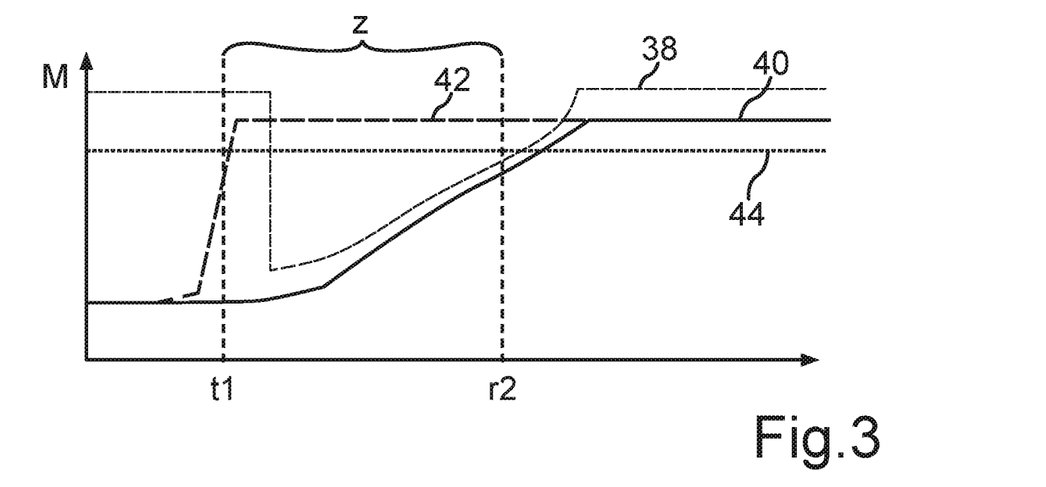
FIG. 3 another diagram to further illustrate the method.
In the figures, elements with identical function are provided with the same reference numeral.

The engagement time includes, e.g., at least a sufficient amount of time to switch the clutches from their first states to their second states. The time characteristic is shown, e.g., in FIG. 3, and is indicated there by numeral 38. Overall, it can be seen that the time characteristic 38 of the drive torque is set, i.e., shaped, as a function of the determined engagement time Z. The engagement time Z extends from a first instant t1 to a second instant t2, whereby engagement of the four-wheel drive 22 starts at instant t1 and ends or is completed at the second instant t2. Furthermore, in FIG. 3, a curve 40 illustrates an actual torque, and a curve 42 illustrates a preferred torque or a torque setpoint, the setpoint being requested, e.g., by the driver of the motor vehicle. Moreover, curve 44 in FIG. 3 illustrates the limit torque, which is also referred to as limit torque. The limit torque is the torque that can be transmitted just barely or at most between the wheels 16 and the ground surface in two-wheel drive mode, without causing excessive slip between the wheels 16 and the ground surface.

Figure 2:
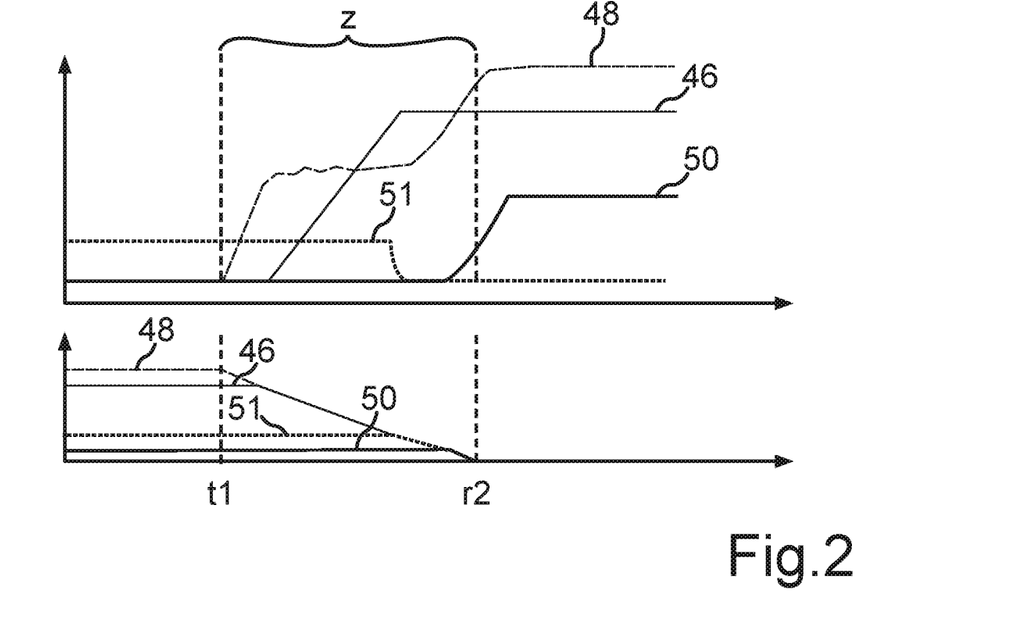
FIG. 2 diagrams to further illustrate the method.

A curve 46 in FIG. 2 illustrates a rotational speed of the drive shaft 32, whereby a curve 48 illustrates a clutch angle of clutch 28 or clutch 30. Furthermore, a curve 51 illustrates a so-called claw current supplying clutch 30, e.g., in order to switch clutch 30 from its first state to its second state. The claw current is, e.g., an electrical current supplying the clutch 30, e.g., in order to move a switch element of the clutch 30, which switch element is designed as a claw and thus as a positive switch element, in order to switch the clutch 30 from its first state to its second state. In addition, a curve 50 illustrates an all-wheel torque, which can only be transmitted between the motor vehicle, in particular the wheels 16 and 18 without causing excessive slippage, e.g., only when four-wheel drive 22 is engaged. In other words, the all-wheel torque represents, e.g., a difference or a differential torque between the said limit torque and the aforementioned torque setpoint desired by the driver, whereby this difference is transmitted to the wheels 18, e.g., by engaging the all-wheel drive, and transmitted via said wheels 18, such that, e.g., if the torque setpoint desired by the driver is greater than the limit torque, when the four-wheel drive 22 disengaged, the setpoint cannot be satisfied, or can be satisfied only up to the limit torque, as long as the four-wheel drive 22 has yet to be engaged. Only after engaging the four-wheel drive 22 can, e.g., the torque provided by the drive unit 20 for driving the wheels 16 and 18 be raised to the setpoint desired by the driver and thus increased, since excessive slip between the wheels 16 and 18 and the ground surface will then not occur.

The limit torque therefore represents a torque with a limit value allowing for the limit torque to be transmitted just barely or at most between the wheels 16 and the ground surface without excessive slip occurring. For the sake of simplicity, the limit torque will also be understood in the following as the limit value, and vice versa. It is particularly clear from the figures that, e.g., the torque setpoint requested by the driver of the motor vehicle is determined, in particular, by the electronic computing device 36.

If, for example, it is determined that the setpoint requested by the driver is greater than the limit torque or the limit value, the torque setpoint cannot then be set during two-wheel drive mode, as this would entail excessive slip. Subsequently, the torque provided by the drive unit 20 is at least temporarily limited to an actual torque value, which is lower than the setpoint desired by the driver, and as a function of the determined engagement time. At least after the completion of the engagement time, e.g., the torque is increased or raised from the actual value up to the setpoint, such that, e.g., the setpoint is set then and only then, whereby the driver's preference is met then and only then when the four-wheel drive 22 is safely engaged and no excessive slip occurs. In this way, e.g., the torque provided by the drive unit 20 can be set sufficiently high, however, not too high, before the completion of the engagement time, such that particularly advantageous dynamics and particularly safe operation can be achieved at the same time.

The advantage of this method is particularly obvious in FIG. 3. For example, curve 40 illustrates the actual torque being set, while curve 38 shows the engagement torque or its time characteristics, which is set by the method. Curve 38 shows that the torque, which is set in the described manner and provided by the drive unit 20, at least substantially precisely in the second instant t2 and thus exactly when the four-wheel drive 22 is engaged, intersects curve 44 and thus the limit torque, such that prior to completion of and particularly during the engagement time, a particularly high dynamic is realized, while still preventing the torque (curve 38) from exceeding the limit torque (curve 44).

In addition, it is possible to avoid premature engagement of the four-wheel drive 22, whereby the vehicle can be operated for a particularly extensive period in the especially efficient two-wheel drive mode. Thus, particularly fuel-efficient operation can be achieved.

The invention claimed is:

1. A method for operating a motor vehicle having a four-wheel drive and a drive unit, which can be switched on and off during travel, wherein the motor vehicle is driven by a torque provided by the drive unit, and the initially disengaged four-wheel drive is switched on, comprising:
    determining at least one limit torque, which can be transmitted while the four-wheel drive is switched off from at least one wheel of the motor vehicle driven by the drive unit to the ground surface, upon which the motor vehicle is travelling, while the slip between the at least one wheel and the ground surface falls below a specifiable threshold value;
    determining an engagement time required to adjust a time characteristic of the torque provided by the drive unit, whereby the torque exceeds the limit torque, when the four-wheel drive is engaged; and
    setting the time characteristic of the torque as a function of the determined engagement time.

2. The method according to claim 1, further comprising:
    determining at least one setpoint of the torque requested by the driver of the motor vehicle; and
    limiting the torque to at least one actual value of the torque, which is lower than the setpoint, depending on the determined engagement time.

3. The method according to claim 2, wherein the torque is limited to the at least one actual value at least prior to completion of the engagement time.

4. The method according to claim 2, wherein after completion of at least the engagement time, an increase in torque from the at least one actual value to the setpoint is enabled and the torque is increased from the at least one actual value to the setpoint.

5. The method according to claim 4, wherein after completion of the engagement time and an additional, specifiable latency time, the increase is enabled and the torque increased from the at least one actual value to the setpoint.

6. The method according to claim 2, wherein the torque is limited to the at least one actual value depending on a torque reserve to be maintained.

7. The method according to claim 2, wherein the engagement time is determined as a function of at least one closing time required for closing at least one clutch to be closed in order to engage the four-wheel drive.

8. The method according to claim 1, wherein the engagement time is determined as a function of at least one acceleration time required to accelerate a first shaft of the motor vehicle, when the four-wheel drive is engaged from a first rotational speed to a second rotational speed, which is greater than the first rotational speed, such that a rotational speed differential is avoided in at least one clutch, via which the first shaft is coupled to at least one second shaft, when engaging the four-wheel drive.

9. The method according to claim 3, wherein after completion of at least the engagement time, an increase in torque from the at least one actual value to the setpoint is enabled and the torque is increased from the at least one actual value to the setpoint.

10. The method according to claim 3, wherein the torque is limited to the at least one actual value depending on a torque reserve to be maintained.

11. The method according to claim 4, wherein the torque is limited to the at least one actual value depending on a torque reserve to be maintained.

12. The method according to claim 5, wherein the torque is limited to the at least one actual value depending on a torque reserve to be maintained.

13. The method according to claim 2, wherein the engagement time is determined as a function of at least one closing time required for closing at least one clutch to be closed in order to engage the four-wheel drive.

14. The method according to claim 3, wherein the engagement time is determined as a function of at least one closing time required for closing at least one clutch to be closed in order to engage the four-wheel drive.

15. The method according to claim 4, wherein the engagement time is determined as a function of at least one closing time required for closing at least one clutch to be closed in order to engage the four-wheel drive.

16. The method according to claim 5, wherein the engagement time is determined as a function of at least one closing time required for closing at least one clutch to be closed in order to engage the four-wheel drive.

17. The method according to claim 6, wherein the engagement time is determined as a function of at least one closing time required for closing at least one clutch to be closed in order to engage the four-wheel drive.

18. The method according to claim 2, wherein the engagement time is determined as a function of at least one acceleration time required to accelerate a first shaft of the motor vehicle, when the four-wheel drive is engaged from a first rotational speed to a second rotational speed, which is greater than the first rotational speed, such that a rotational speed differential is avoided in at least one clutch, via which the first shaft is coupled to at least one second shaft, when engaging the four-wheel drive.

19. The method according to claim 3, wherein the engagement time is determined as a function of at least one acceleration time required to accelerate a first shaft of the motor vehicle, when the four-wheel drive is engaged from a first rotational speed to a second rotational speed, which is greater than the first rotational speed, such that a rotational speed differential is avoided in at least one clutch, via which the first shaft is coupled to at least one second shaft, when engaging the four-wheel drive.

20. The method according to claim 4, wherein the engagement time is determined as a function of at least one acceleration time required to accelerate a first shaft of the motor vehicle, when the four-wheel drive is engaged from a first rotational speed to a second rotational speed, which is greater than the first rotational speed, such that a rotational speed differential is avoided in at least one clutch, via which the first shaft is coupled to at least one second shaft, when engaging the four-wheel drive.

* * * * *